(12) United States Patent
Boschker et al.

(10) Patent No.: US 9,746,340 B2
(45) Date of Patent: Aug. 29, 2017

(54) MAP STORAGE FOR NAVIGATION SYSTEMS

(75) Inventors: Breght Roderick Boschker, Hilversum (NL); Jeroen Trum, Eindhoven (NL)

(73) Assignee: TomTom Navigation B.V., Amsterdam (NL)

( * ) Notice: Subject to any disclaimer, the term of this patent is extended or adjusted under 35 U.S.C. 154(b) by 529 days.

(21) Appl. No.: 13/577,291

(22) PCT Filed: Feb. 4, 2011

(86) PCT No.: PCT/EP2011/051680
§ 371 (c)(1),
(2), (4) Date: Aug. 6, 2012

(87) PCT Pub. No.: WO2011/095603
PCT Pub. Date: Aug. 11, 2011

(65) Prior Publication Data
US 2012/0310964 A1    Dec. 6, 2012

Related U.S. Application Data

(60) Provisional application No. 61/301,256, filed on Feb. 4, 2010.

(51) Int. Cl.
*G06F 17/30* (2006.01)
*G01C 21/36* (2006.01)
(Continued)

(52) U.S. Cl.
CPC ......... *G01C 21/3667* (2013.01); *G01C 21/32* (2013.01); *G01C 21/36* (2013.01);
(Continued)

(58) Field of Classification Search
CPC ......... G06F 17/30247; G06F 17/30864; G06F 19/321; G06F 17/30244; G06F 17/30333;
(Continued)

(56) References Cited

U.S. PATENT DOCUMENTS 5,291,602 A * 3/1994 Barker .................. G06F 8/00
707/E17.008
6,092,076 A  7/2000 McDonough et al.
(Continued)

FOREIGN PATENT DOCUMENTS

| EP | 1526359 A1 | 4/2005 |
| WO | 2008054805 A2 | 5/2008 |
| WO | 2008089231 A1 | 7/2008 |

OTHER PUBLICATIONS

Carswell, James D., David C. Wilson, and Michela Bertolotto. "Digital image similarity for geo-spatial knowledge management." Advances in Case-Based Reasoning. Springer Berlin Heidelberg, 2002. 58-72.*

(Continued)

*Primary Examiner* — Sultana M Zalalee

(57) ABSTRACT

When preparing a representation of map display information for use by a navigation device, a set of source map data (600) is subject to a similarity analysis step (601) to try to identify elements in the source map data (600) that are similar in terms of their shape and/or their appearance when displayed. A classification and transformation parameter generation step (602) then classifies elements in the map into groups of similar elements as determined by the similarity analysis (601) and also determines the parameters and conditions under which the identified map elements can be considered to be similar. This is then used to generate a map database that includes a library of predefined map display elements having parametrable aspects, which map display elements can then be used to construct a desired map for display.

13 Claims, 6 Drawing Sheets

(51) Int. Cl.
*G01C 21/32* (2006.01)
*G01S 5/00* (2006.01)
*G01S 5/02* (2010.01)
*H04W 64/00* (2009.01)
*G01S 19/42* (2010.01)
*G01S 19/52* (2010.01)

(52) U.S. Cl.
CPC .......... *G01S 5/0009* (2013.01); *G01S 5/0252* (2013.01); *G01S 19/42* (2013.01); *G01S 19/52* (2013.01); *H04W 64/00* (2013.01)

(58) Field of Classification Search
CPC ......... G06F 17/30554; G06F 17/30867; G06F 3/04817; G06F 17/30256; G06F 2216/03
See application file for complete search history.

(56) References Cited

U.S. PATENT DOCUMENTS

| | | | |
|---|---|---|---|
| 6,674,445 B1 | 1/2004 | Chithambaram et al. | |
| 6,710,774 B1 | 3/2004 | Kawasaki et al. | |
| 6,735,343 B2 | 5/2004 | Michael | |
| 7,096,117 B1* | 8/2006 | Gale et al. | 701/532 |
| 7,228,006 B2 | 6/2007 | Stubler et al. | |
| 2002/0012471 A1 | 1/2002 | Nayyar | |
| 2002/0037105 A1 | 3/2002 | Michael | |
| 2005/0085996 A1 | 4/2005 | Park et al. | |
| 2007/0226187 A1 | 9/2007 | Beatty et al. | |
| 2008/0021644 A1 | 1/2008 | Meyer | |
| 2008/0109159 A1* | 5/2008 | Shi et al. | 701/208 |
| 2008/0143735 A1* | 6/2008 | Besley | G06K 9/6211 345/582 |
| 2011/0074765 A1 | 3/2011 | Oterhals et al. | |

OTHER PUBLICATIONS

International Search Report issued Jan. 3, 2012 for International Application No. PCT/EP2011/051680.
International Search Report issued Jan. 3, 2012 for International Application No. PCT/EP2011/051679.

* cited by examiner

MAP STORAGE FOR NAVIGATION SYSTEMS

CROSS-REFERENCES TO RELATED APPLICATIONS

This application is the National Stage of International Application No. PCT/EP2011/051680, filed Feb. 4, 2011 and designating the United States. The application claims the benefit of U.S. Provisional Application No. 61/301,256 filed Feb. 4, 2010. The entire contents of both these applications are incorporated herein by reference.

FIELD OF THE INVENTION

This invention relates to navigation devices and to methods and apparatus for storing map information, such as navigation maps, for display. Illustrative embodiments of the invention relate to portable navigation devices (so-called PNDs), in particular PNDs that include Global Positioning System (GPS) signal reception and processing functionality. Other embodiments relate, more generally, to any type of processing device that is configured to display map information and/or to execute navigation software so as to provide route planning, and preferably also navigation, functionality.

BACKGROUND TO THE INVENTION

Portable navigation devices (PNDs) that include GPS (Global Positioning System) signal reception and processing functionality are well known and are widely employed as in-car or other vehicle navigation systems.

In general terms, a modern PNDs comprises a processor, memory (at least one of volatile and non-volatile, and commonly both), and map data stored within said memory. The processor and memory cooperate to provide an execution environment in which a software operating system may be established, and additionally it is commonplace for one or more additional software programs to be provided to enable the functionality of the PND to be controlled, and to provide various other functions.

Typically these devices further comprise one or more input interfaces that allow a user to interact with and control the device, and one or more output interfaces by means of which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display may be configured as a touch sensitive display (by means of a touch sensitive overlay or otherwise) to additionally provide an input interface by means of which a user can operate the device by touch.

Devices of this type will also often include one or more physical connector interfaces by means of which power and optionally data signals can be transmitted to and received from the device, and optionally one or more wireless transmitters/receivers to allow communication over cellular telecommunications and other signal and data networks, for example Wi-Fi, Wi-Max GSM and the like.

PND devices of this type also include a GPS antenna by means of which satellite-broadcast signals, including location data, can be received and subsequently processed to determine a current location of the device.

The PND device may also include electronic gyroscopes and accelerometers which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in PND devices if it is expedient to do so.

The utility of such PNDs is manifested primarily in their ability to determine a route between a first location (typically a start or current location) and a second location (typically a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favorite or recently visited destinations.

Typically, the PND is enabled by software for computing a "best" or "optimum" route between the start and destination address locations from the map data. A "best" or "optimum" route is determined on the basis of predetermined criteria and need not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

PNDs of this type may typically be mounted on the dashboard or windscreen of a vehicle, but may also be formed as part of an on-board computer of the vehicle radio or indeed as part of the control system of the vehicle itself. The navigation device may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of a PND, once a route has been calculated, the user interacts with the navigation device to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the PND forms one primary function, and navigation along such a route is another primary function.

During navigation along a calculated route, it is usual for such PNDs to provide visual and/or audible instructions to guide the user along a chosen route to the end of that route, i.e. the desired destination. It is also usual for PNDs to display map information on-screen during the navigation, such information regularly being updated on-screen so that the map information displayed is representative of the current location of the device, and thus of the user or user's vehicle if the device is being used for in-vehicle navigation.

An icon displayed on-screen typically denotes the current device location, and is centered with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the device is automatic route re-calculation in the event that: a user deviates from the previously calculated route during navigation (either by accident or intentionally); real-time traffic conditions dictate that an alternative route would be more expedient and the device is suitably enabled to recognize such conditions automatically, or if a user actively causes the device to perform route re-calculation for any reason.

It is also known to allow a route to be calculated with user defined criteria; for example, the user may prefer a scenic route to be calculated by the device, or may wish to avoid any roads on which traffic congestion is likely, expected or currently prevailing. The device software would then calculate various routes and weigh more favorably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of PNDs, it is possible to use the device purely for information display, or "free-driving", in which only map information relevant to the current device location is displayed, and in which no route has been calculated and no navigation is currently being performed by the device. Such a mode of operation is often applicable when the user already knows the route along which it is desired to travel and does not require navigation assistance.

Devices of the type described above, for example the GO 950 LIVE model manufactured and supplied by TomTom International B.V., provide a reliable means for enabling users to navigate from one position to another.

As will be appreciated from the above, an important aspect of the operation of such navigation devices is the display of map information to the user by the device. This may be done, for example, by rendering the whole scene based on the vector data for each frame.

Another known technique is to represent the map information (in the 3D world) on a tile-by-tile basis, i.e. to represent the 3D "world" view of the map (which will then be transformed to 2D screen space for display, as is known in the art) as one or more tiles, each representing some or all of the map in the 3D world view of the map to be displayed.

In such arrangements, the tiles may, as is known in the art, be stored and displayed at varying levels of detail, to provide further visual improvement. The different level of detail tiles may also be overlaid and filtered to provide a more seamless transition between levels of detail.

Such tile-based map and road network rendering is an efficient and powerful way for displaying road network and geographic data in both two and three dimensions. Tile-based rendering is especially efficient given that most mobile graphics rendering subsystems (which is typically what will be used in a PND (and may be implemented in hardware or software or both, as is known in the art)) are limited in the amount of geometry they can process in order to get an acceptable frame rate and that a lot of the more powerful features found in desktop graphics accelerators have not made it to the mobile space yet.

An important aspect of the provision of map and navigation information for use with PNDs is accordingly the storage of the map information to be displayed to the user of the PND in use. Typically, a set of predetermined map information will be stored, e.g. in the form of bitmaps representing tiles that will be used to form the displayed maps, and/or as a 2D/3D vector representation of the maps to be displayed, which map information will then be retrieved from memory and displayed in use. The need to store such map information is a significant requirement of PND operation.

SUMMARY OF THE INVENTION

According to a first aspect of the present invention, there is provided a method of preparing map information for use for displaying maps on a mapping or navigation apparatus, the method comprising:

receiving initial map information representing a map or maps to be displayed;

analyzing the initial map information to identify similarity within the initial map information;

preparing a further representation of the initial map information based on the similarity analysis; and storing the further representation of the map information for use by a mapping or navigation apparatus.

According to a second aspect of the present invention, there is provided a system for preparing map information for use for displaying maps on a mapping or navigation apparatus, the system comprising:

means for analyzing initial map information representing a map or maps to be displayed to identify similarity within the initial map information;

means for preparing a further representation of the initial map information based on the similarity analysis; and means for storing the further representation of the map information for use by a mapping or navigation apparatus.

In the present invention, a representation of map information to be used by a mapping or navigation apparatus is prepared, based on an analysis of the similarity present within the initial, base map information. As will be discussed further below, this has the advantage of potentially being able to store the map information in a more efficient form as compared to its original, "raw" state, thereby, e.g., saving on the amount of storage resource that needs to be used for the map information (and thus provided in a given PND, for example).

The Applicants have recognized that many maps to be displayed on PNDs can contain a large degree of self-similarity, for example due to re-occurring patterns (repetition) within and between the maps being displayed. For example, in more modern, urban environments, roads and buildings may typically be set out in rectangular grids, in which repeating patterns are often present. Even in mountainous or mediaeval cities, there may be repetition and similarities across the road network, albeit potentially at a lower scale. Individual road features, such as roundabouts, may also share common features, wherever they appear.

The present invention exploits this recognition, by analyzing initial, "source" map information for such self-similarity and repetition, and then preparing a representation of the initial map information based on the similarity analysis. For example, in a simple case, it would be possible, e.g., to store a single more detailed representation of a roundabout, and then point to that representation (i.e. repeat that representation), wherever a roundabout appears in the map or maps in question.

A given map or maps can accordingly potentially be stored in a more compact form, thereby requiring less storage space to be provided on a PND for storing the map information, for example.

The initial map information may represent any desired map information that is to be displayed. It may, e.g., represent a single map or plural maps, and can take any suitable and desired form. In one preferred embodiment, the initial map information comprises a vector representation of the map or maps in question. In another preferred embodiment it comprises a tile-based representation of the map information. (In both these cases it will be possible to identify appropriate similarities and repetition within the map information that can then be exploited so as to compress the map information.)

(As will be appreciated, references herein to the map information being a tile-based representation of a map to be displayed refers to the use of tiles (bitmaps) for representing the map information in the 3D "world" space, which tiles in the 3D world which will then be projected to the 2D screen space when they are actually displayed.)

The generated further representation of the map information may similarly take any suitable and desired form, such as and preferably, a vector and/or tile-based representation of the map or maps in question. It preferably corresponds to the form that the initial map information took.

The similarity analysis that is carried out on the initial map information and the consequent generation of the further representation of the map information can take any desired and suitable forms. The aim of this process is to identify similarity within the map being displayed, so as to allow the initial map information to be represented in an alternative, potentially more efficient form. The similarity analysis preferably identifies potential redundancy in the initial map, which redundancy is then, preferably, removed, at least in part, to provide the further modified representation of the map.

The similarity analysis preferably attempts to identify elements represented by the initial map information that can be considered to be similar to each other (as opposed, e.g., to looking for similarity at the bit level in the map information (in the bitwise representation of the map information)). Preferably the similarity analysis looks for elements of the map that will be similar when displayed.

In a particularly preferred embodiment, the similarity analysis (and preparation of the further representation of the map information) looks for similar geometrical elements (features) in the map that the initial map information represents (i.e. for similarity at the geometry level in the map), e.g. and preferably, so as to identify similarity (and any redundancy) between geometrical features in the map (represented in the initial map information). Most preferably the similarity analysis looks for two-dimensional and/or three-dimensional elements of the map that will be similar when displayed.

In a particularly preferred embodiment, the similarity analysis looks for shape similarity in the initial map information, i.e. for elements in the original map that have similar shapes, and, e.g., that therefore can be consolidated by only storing, e.g., and preferably, a single copy of the shape for each element that has a similar shape. An example of this would be that all roundabouts will generally be round, and so can be considered to be similar in shape. Thus, in a particularly preferred embodiment, the similarity analysis looks for (and identifies) those (map) elements that the original map information represents that can be considered to have similar shapes (based, e.g., and preferably, on a suitable image or component analysis of the elements in question).

The similarity analysis preferably also or instead, and preferably also, considers similarity of representation of the map information, i.e. tries to identify elements of the map that will be similar when presented on a display to a user. Examples of this would be that all roundabouts will appear oval in a 3D-representation on a display, roads will normally have the same appearance of being gray, with white markings, when displayed, etc . . . . Thus, the similarity analysis preferably looks for map elements that the map information represents that will be similar in the visual domain (when displayed to a user). Thus, in a particularly preferred embodiment, the similarity analysis looks for (and identifies) elements in the initial map information that can be considered to be similar in the visual domain (when displayed).

The similarity analysis in these arrangements (and otherwise) preferably considers whether the, e.g., map elements, can be considered to be sufficiently similar or not, e.g., by comparison to some form of predefined similarity threshold. The similarity test preferably comprises a function that calculates a relative error value between the, e.g. map elements, being compared (e.g., using an image analysis or primary component analysis technique), and then compares the error to a selected threshold value, to determine whether the data for a given element is redundant (and so can be, e.g., omitted) or not.

The similarity analysis may, e.g., use, and preferably does use, a suitable image analysis technique. In a preferred embodiment, the similarity analysis uses one or more of (frequency) component analysis techniques such as Fourier analysis, Discrete Cosine Transformation (DCT), and/or Principal Component Analysis (PCA), pattern matching techniques, local search methods such as simulated annealing, simple heuristics and/or genetic algorithms, to try to identify (and exploit) similarity and repetition within the initial map information.

The further representation of the map information that is prepared based on the similarity analysis can be generated in any desired and suitable manner following the similarity analysis. In a particularly preferred embodiment, it attempts to, and preferably does, reduce redundancy in the map information, most preferably by reducing the number of copies (preferably to a single copy) of similar map elements that are included in the representation of the map. Thus, for example, where plural similarly shaped map elements, such as roundabouts, are identified by the similarity analysis, preferably a reduced number of copies, and preferably only a single copy, of "roundabout" data is included in the further representation of the map information. Removing redundancy in the map information in this way, may, e.g., allow the map to be represented in a more efficient manner.

Thus, in a particularly preferred embodiment, the similarity analysis and further map representation generation is carried out by comparing map elements represented in the initial map information, such as, and preferably, distinct geometric and/or display features within the map, to see if they are sufficiently similar, and then only storing one copy of elements (features) found to be similar to each other (i.e. removing, in effect, duplicated data from the map information).

The similarity analysis and generation of the further representation of the map information scheme used may be a lossless scheme, or a lossy scheme (subject, e.g., to some desired minimum level of accuracy), as desired. In general (and preferably) the present invention will use and provide a lossy scheme, as it, e.g., reduces redundancy in the initial map data based on a similarity assessment, rather than, e.g., based on an equality assessment.

In one preferred embodiment, the similarity analysis and further map representation generation identifies and extracts a set of base features, preferably in the form of map elements, from the initial map information, which features can then be used to re-construct the original map information data set.

Thus, in a particularly preferred embodiment, the similarity analysis and further map representation generation comprises classifying map elements in the initial map information (that the initial map information represents) into groups of similar elements (e.g. having similar shapes and/or similar appearances when displayed). Most preferably, the similarity analysis also determines the parameters, such as any necessary transformation, such as rotation, scaling, etc., under which the map elements can be considered to be similar.

The preparation of the further representation of the map information preferably then comprises preparing information that indicates the position of an element in the map together with a reference to (data representing) a given predefined, reference map element that is to be used for that map element when the particular instance of the map is displayed. Most preferably, any additional parameters, such as transformations to be applied, when the map element is to be displayed are also generated and stored in the further representation of the map information. This process preferably therefore, in effect, identifies, and/or sorts and classifies elements in the initial map information into, a set of reference map elements (e.g. shapes), and determines for elements represented by or in the initial map information which reference map element a given element of the initial map information is similar to, and any parameters to be applied or required to display the reference map element appropriately for the actual map element in question.

As well as the similarity assessment, e.g. at the geometrical features level, more conventional data and image compression techniques could also be used if desired. For example, discrete cosine transformation could be used to transform the map information into its frequency components and the high-frequency components that do not contribute significantly to the visible image removed to further the compress the map information.

The generated further presentation of the map information can take any suitable and desired form (and this will depend, e.g., on the nature of the initial map information and the representation generation process that has been used).

In a particularly preferred embodiment, the further representation of the map data is such as to allow the map information to be displayed using varying levels of detail.

In a particularly preferred embodiment, the generated, further representation of the map information includes a set or library of base map display elements, which elements can then be used to reproduce a desired map or maps. Thus, in a particularly preferred embodiment, the further representation of the map information includes a set of one or more, and preferably of plural, predefined map display elements. Most preferably, the representation of the map information also includes a set of "map construction" data, indicating how to reproduce the map (or maps) using the predefined map display elements (using the predefined map display element "library").

The predefined map display elements preferably represent appropriate map features, such as road sections, road junctions, roundabouts, buildings, blocks of buildings, bridges, etc.

The base, predefined map display elements preferably comprise one or more, and preferably plural, (predefined) shape templates, which can then be used to reconstruct a map itself. The shape templates may, e.g., represent larger features, such as roundabouts, and/or smaller features such as entrances or exits to roundabouts, etc.. Storing display elements (e.g. shape templates) representing smaller scale features may facilitate greater reuse of the stored display elements, and vice-versa.

In a particularly preferred embodiment, display elements (e.g. shape templates) for different scale features are included in the generated further representation of the map information. Most preferably, a given display element (e.g. shape template) can refer to other display elements in the representation of the map information (i.e. can indicate that the display element in question is to be constructed from or includes another display element or elements in the map representation "library").

In a particularly preferred embodiment, the generated further map information representation uses a hierarchically arranged set of predefined map display elements (e.g. shape templates), i.e. such that a given display element (shape template) is represented at plural different levels of detail. This then allows an element having the required level of detail for the map view being displayed to be used, rather than, e.g. always having to load and store a high resolution image even when that may not be perceptible to a user. The map display elements could also or instead be deconstructed into multiple sub-elements.

The use of a set of predefined map display elements for the representation of the map information has a number of advantages. For example, not only does it facilitate representing the original map information in a potentially more compressed form, but it facilitates updating the stored maps, and, indeed, adding new maps, as any new map feature (or map) can be indicated by reference to the appropriate predefined map display element(s).

It is believed that such representation of map information for use for displaying maps on a PND, for example, may be new and advantageous in its own right.

Thus, according to a third aspect of the present invention, there is provided a method of displaying a map on a mapping or navigation apparatus, the method comprising:

using one or more predefined map display elements from a set of predefined map display elements to construct the map that is displayed.

According to a fourth aspect of the present invention, there is provided a mapping or navigation apparatus, comprising:

means for storing a set of predefined map display elements; and means for using one or more predefined map display elements from the stored set of predefined map display elements to construct a map that is displayed.

According to a fifth aspect of the present invention, there is provided a method of representing a map to be displayed on a mapping or navigation apparatus, the method comprising:

representing the map using one or more predefined map display elements from a set of predefined map display elements.

According to a sixth aspect of the present invention, there is provided a set of data representing a map to be displayed on a mapping or navigation apparatus, the set of data comprising:

data defining a set of predefined map display elements that can be used to construct a map to be displayed; and data defining a set of instructions indicating how map display elements from the stored set of predefined map display elements should be used to display a map to be displayed.

As will be appreciated by those skilled in the art, these aspects of the invention can and preferably do, include one or more or all of the preferred and optional features of the invention described herein, as appropriate. Thus, the predefined map display elements preferably comprise predefined shape templates, representing, e.g., predefined shapes to be displayed from which a map for display can be constructed.

Similarly, the map information that is used to construct the map for display preferably also comprises a set of data indicating how the predefined map display elements (e.g. shape templates) should be used to construct (display) a given map to be displayed.

It will be appreciated that the library of predefined map display elements can be used in common for plural maps, thus the system may and preferably does, create and store plural sets of map "construction" information, each set referencing the (same) stored library of predefined map display elements, and representing, e.g., a different map that can be displayed.

Thus, in a particularly preferred embodiment, the generated representation of the map information is in the form of (and the map display process uses) a map database comprising a library of predefined map display elements (preferably in the form of shape templates), together with a set of map "construction" information that references the library of predefined map display elements to allow a map or maps to be displayed.

The map "construction" information in these aspects and embodiments of the invention can take any suitable and desired form. It preferably indicates which predefined map display elements (e.g. shape templates) are to be used for constructing the map when it is to be displayed, and the positions of those elements in the map.

In a particularly preferred embodiment, the map "construction" information can indicate that a given predefined map display element should be subject to a transformation when it is displayed. Such transformation could, e.g., and preferably does, comprise one or more of rotating, scaling and/or translating the map display element relative to its stored, "predefined" state or configuration. This facilitates using predefined display elements for map features that they may not match exactly.

In a preferred embodiment, a predefined map display element can have one or more attributes associated with it, e.g., that are to be applied or used when the element is displayed. Such attributes could comprise, e.g., (an indication of) a texture or textures that is to be applied to the element (e.g. to show road markings, etc.). This information could also or instead be included as part of the map "construction" information.

In a particularly preferred embodiment, one or more of the predefined map display elements can and preferably do have one or more parameters associated with them, which parameters can be defined so as to affect or modify the way the element is displayed (i.e. the map display elements have parametrable aspects). These parameters could, e.g., and preferably do, relate to parameters such as the position (e.g. longitude and latitude), rotation, road-attributes (such as turn restrictions, one-way roads), etc. of the display element as it is to be displayed (for the map in question). Preferably these parameters can be set in use, e.g., each time the element is to be displayed, to control the exact way the element is displayed. Most preferably the parameter settings to use for a given instance of a predefined map display element are associated with and/or included in the map "construction" information for the map in question.

In a preferred embodiment, the generated representation of the map information includes information to allow a device displaying the map information to test and determine how similar respective parts of the map information are (such as how similar respective map tiles are, where the map is represented in a tile-based form). This can then allow further savings in terms of the display of the tiles, as will be discussed further below. This similarity test information could, e.g., comprise data representing the contributing component(s) of the, e.g., tile, as determined by primary component analysis.

Once the further representation of the map information has been prepared, it is then stored for use by the device, such as the PND, that is to display the map(s). The data can be stored in any desired and suitable fashion. It may be stored, e.g., in a local memory of the displaying device (e.g. PND) itself. Alternatively or additionally, the map information could be stored in a remote memory, coupled to a server, for example, and transferred to the displaying device (e.g. PND) in use, e.g., via an, e.g. wireless, network connection.

The prepared further representation of the map information can similarly be used to display the map in question in any suitable and desired manner. Exactly how this is done will depend upon the form of the map information, but essentially the information should be read and processed appropriately to allow the map to be displayed. For example, the displaying device, such as the PND, could read the map "construction" information, and load and display the predefined map display elements indicated by the map construction information, using any defined parameters, attributes, and/or transformations indicated by the map "construction" information as appropriate.

The present invention accordingly preferably includes steps of using, and/or a mapping or navigation apparatus that uses, the prepared representation of the map information to display a map, and extends to the use of the prepared, further representation of the map information to display a map.

The principles of the present invention in any of its aspects and embodiments are applicable to any form of mapping or navigation apparatus and to the display of any desired and suitable form of map information. In preferred embodiments the apparatus is a navigation apparatus. One particular area of utility is in relation to portable navigation devices (PND). In embodiments, therefore, the mapping or navigation apparatus is a portable navigation device (PND). In accordance with a further aspect, the present invention provides a portable navigation device (PND) that stores and displays the map information prepared in accordance with any of the aspects or embodiments of the invention described. The PND may, and preferably does, include one or more other features typical of PNDs, such as, and preferably, an input interface configured to enable a user to interact with and/or control the apparatus and/or device.

The invention is also applicable to navigation apparatus which is provided as part of an integrated navigation system. For example the apparatus may form part of an in-vehicle integrated navigation system. In accordance with another aspect of the invention, the present invention provides a navigation system comprising a navigation apparatus that stores and displays the map information prepared in accordance with any of the aspects or embodiments of the invention described. The navigation system may be an integrated in-vehicle navigation system.

Regardless of its implementation, a navigation apparatus used with the present invention may comprise a processor, memory, and digital map data stored within said memory. The processor and memory cooperate to provide an execution environment in which a software operating system may be established. One or more additional software programs may be provided to enable the functionality of the apparatus to be controlled, and to provide various other functions. A navigation apparatus of the invention may preferably include GPS (Global Positioning System) signal reception and processing functionality. The apparatus may comprise one or more output interfaces by means of which information may be relayed to the user. The output interface(s) may include a speaker for audible output in addition to the visual display. The apparatus may comprise input interfaces including one or more physical buttons to control on/off operation or other features of the apparatus.

In other embodiments, the mapping or navigation apparatus may be implemented by means of an application of a processing device which does not form part of a specific mapping or navigation device. For example the invention may be implemented using a suitable computer system arranged to execute mapping or navigation software. The system may be a mobile or portable computer system e.g. a mobile telephone or laptop, or may be a desktop system.

Although the present invention has been described above with particular reference to tile-based map information rendering, the techniques of the present invention may be applied to other techniques for rendering map information. For example, the techniques of the present invention could equally be used to provide compressed map information for display when rendering maps using vector graphics or triangle meshes, etc.

As will be appreciated by those skilled in the art, all of the aspects and embodiments of the invention described herein can and preferably do include any one or more of the preferred and optional features of the invention described herein, as appropriate.

The methods in accordance with the present invention may be implemented at least partially using software e.g. computer programs. The present invention thus also extends to a computer program comprising computer readable instructions executable to perform a method according to any of the aspects or embodiments of the invention.

The invention correspondingly extends to a computer software carrier comprising such software which when used to operate a system or apparatus comprising data processing means causes in conjunction with said data processing means said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like.

Where not explicitly stated, it will be appreciated that the invention in any of its aspects may include any or all of the features described in respect of other aspects or embodiments of the invention to the extent they are not mutually exclusive. In particular, while various embodiments of operations have been described which may be performed in the method and by the system or apparatus, it will be appreciated that any one or more or all of these operations may be performed in the method and by the system or apparatus, in any combination, as desired, and as appropriate.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 5 shows an exemplary map to be displayed that the technique of the present invention can be applied to;

DETAILED DESCRIPTION OF PREFERRED EMBODIMENTS

Preferred embodiments of the present invention will now be described with particular reference to a PND. It should be remembered, however, that the teachings of the present invention are not limited to PNDs but are instead universally applicable to any type of processing device that is configured to display map information (and preferably to execute navigation software so as to provide route planning and navigation functionality). It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software.

It will also be apparent from the following that the teachings of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that travelling to the "destination" must occur, or indeed that the presence of a destination requires the designation of a corresponding start location.

Figure 1:
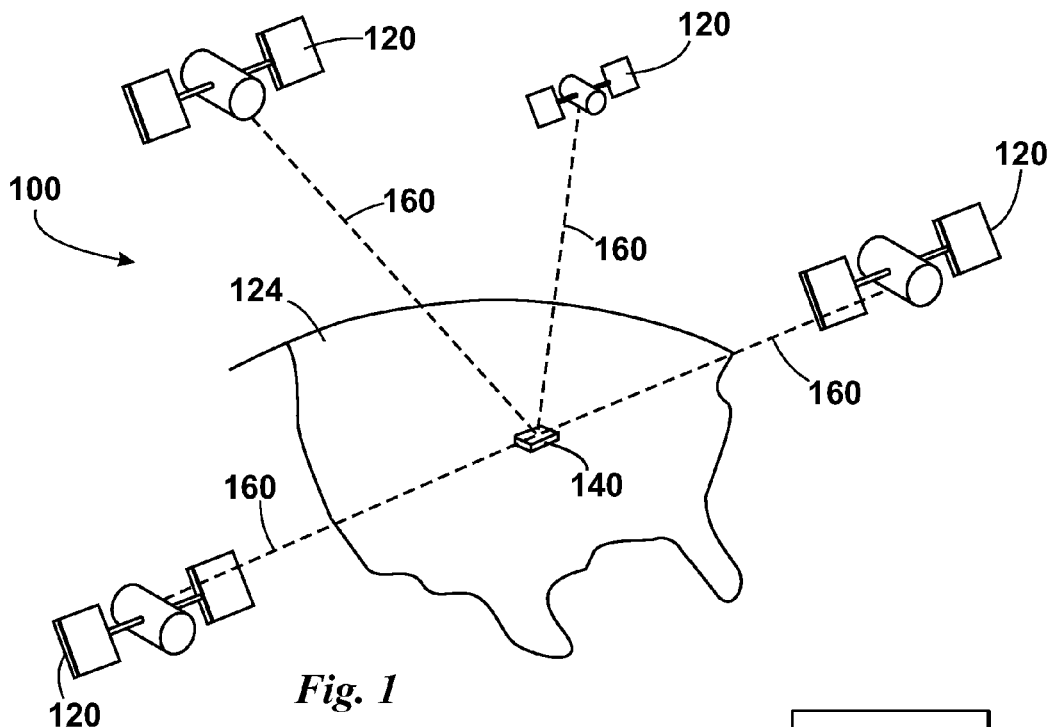
FIG. 1 is a schematic illustration of a Global Positioning System (GPS)

With the above provisos in mind, FIG. 1 illustrates an example view of Global Positioning System (GPS), usable by navigation devices. Such systems are known and are used for a variety of purposes. In general, GPS is a satellite-radio based navigation system capable of determining continuous position, velocity, time, and in some instances direction information for an unlimited number of users. Formerly known as NAVSTAR, the GPS incorporates a plurality of satellites which orbit the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140 is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
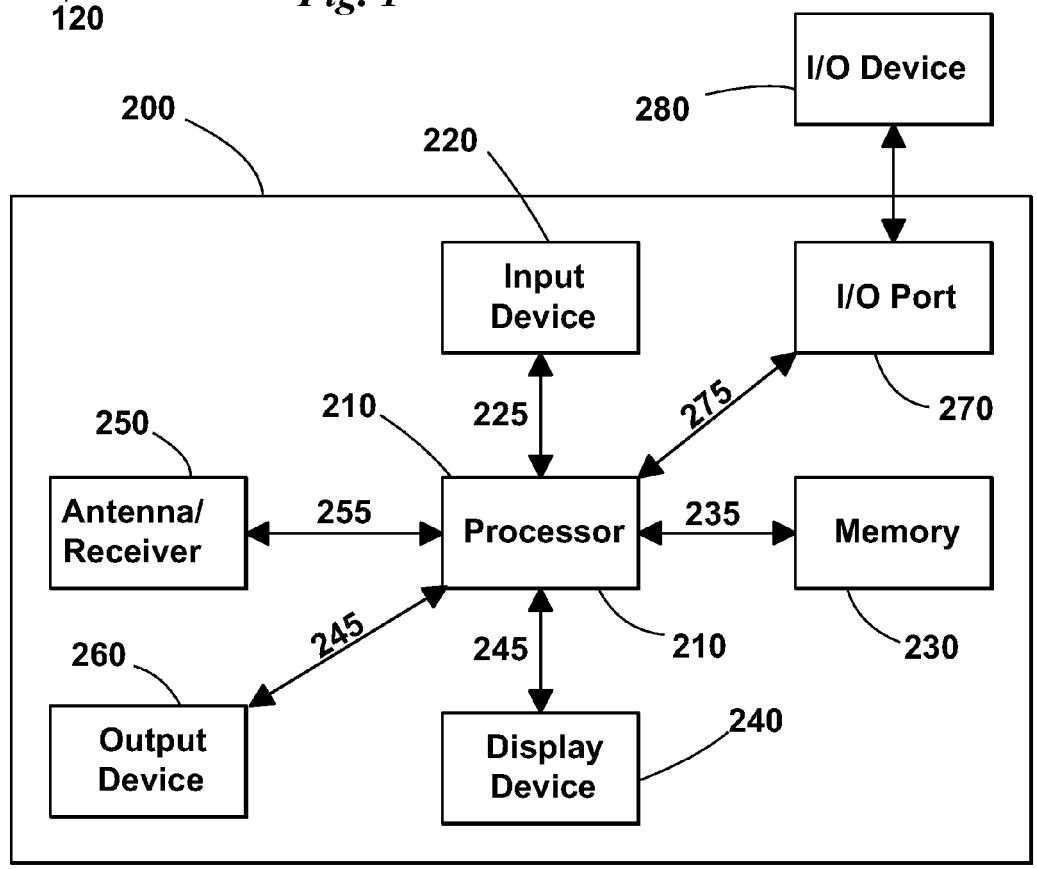
FIG. 2 is a schematic illustration of electronic components arranged to provide a navigation device.

FIG. 2 is an illustrative representation of electronic components of a navigation device 200 according to a preferred embodiment of the present invention, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. In a particularly preferred arrangement the input device 220 and display screen 240 are integrated into an integrated input and display device, including a touchpad or touch screen input so that a user need only touch a portion of the display screen 240 to select one of a plurality of display choices or to activate one of a plurality of virtual buttons.

The navigation device may include an output device 260, for example an audible output device (e.g. a loudspeaker). As output device 260 can produce audible information to a user of the navigation device 200, it is should equally be understood that input device 240 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectible to an I/O device 280 external to the navigation device 200. The memory resource 230 comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered to be within the scope of the present application. For example, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a vehicle such as a bicycle, a motorbike, a car or a boat for example. Such a navigation device 200 is then removable from the docked location for portable or handheld navigation use.

Figure 3:
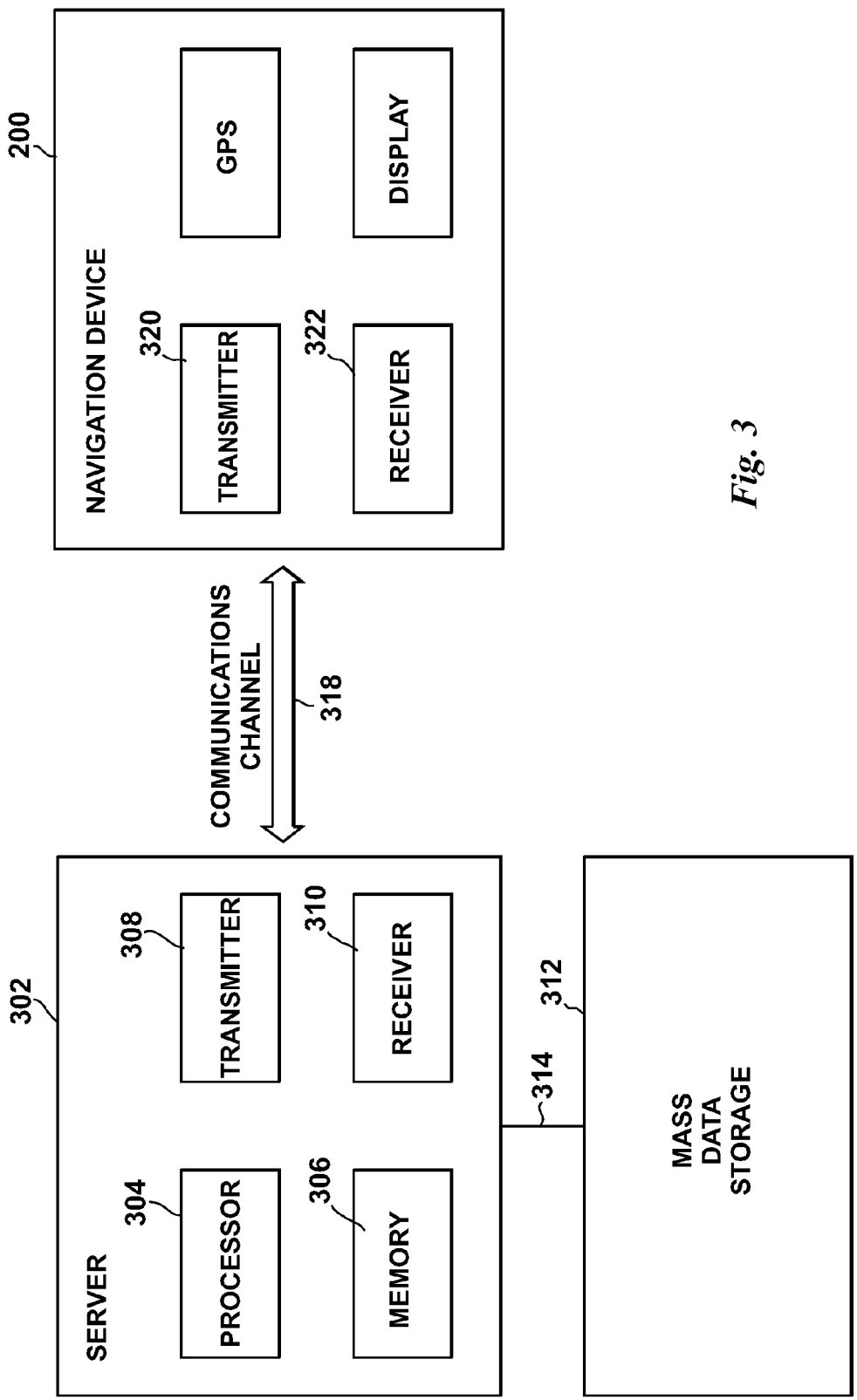
FIG. 3 is a schematic illustration of the manner in which a navigation device may receive information over a wireless communication channel.

Referring now to FIG. 3, the navigation device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example). Thereafter, through its network service provider, the mobile device can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device (via a service provider) and another device such as the server 302, using an internet (such as the World Wide Web) for example, can be done in a known manner. This can include use of TCP/IP layered protocol for example. The mobile device can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The navigation device 200 can further complete a data connection with the mobile device, and eventually with the internet and server 302, via existing Bluetooth technology for example, in a known manner, wherein the data protocol can utilize any number of standards, such as GPRS, the data protocol standard for the GSM standard, for example.

The navigation device 200 may include its own mobile phone technology within the navigation device 200 itself (including an antenna for example, or optionally using the internal antenna of the navigation device 200). The mobile phone technology within the navigation device 200 can include internal components as specified above, and/or can include an insert able card (e.g. Subscriber Identity Module or SIM card), complete with necessary mobile phone technology and/or an antenna for example. As such, mobile phone technology within the navigation device 200 can similarly establish a network connection between the navigation device 200 and the server 302, via the internet for example, in a manner similar to that of any mobile device.

For GPRS phone settings, a Bluetooth enabled navigation device may be used to correctly work with the ever changing spectrum of mobile phone models, manufacturers, etc., model/manufacturer specific settings may be stored on the navigation device 200 for example. The data stored for this information can be updated.

In FIG. 3 the navigation device 200 is depicted as being in communication with the server 302 via a generic communications channel 318 that can be implemented by any of a number of different arrangements. The server 302 and a navigation device 200 can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the navigation device 200 and the server 302. Both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the navigation device 200 via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated automatically or upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

As indicated above in FIG. 2, a navigation device 200 includes a processor 210, an input device 220, and a display screen 240. The input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 241, such as audio input/output devices for example.

Figure 4A:
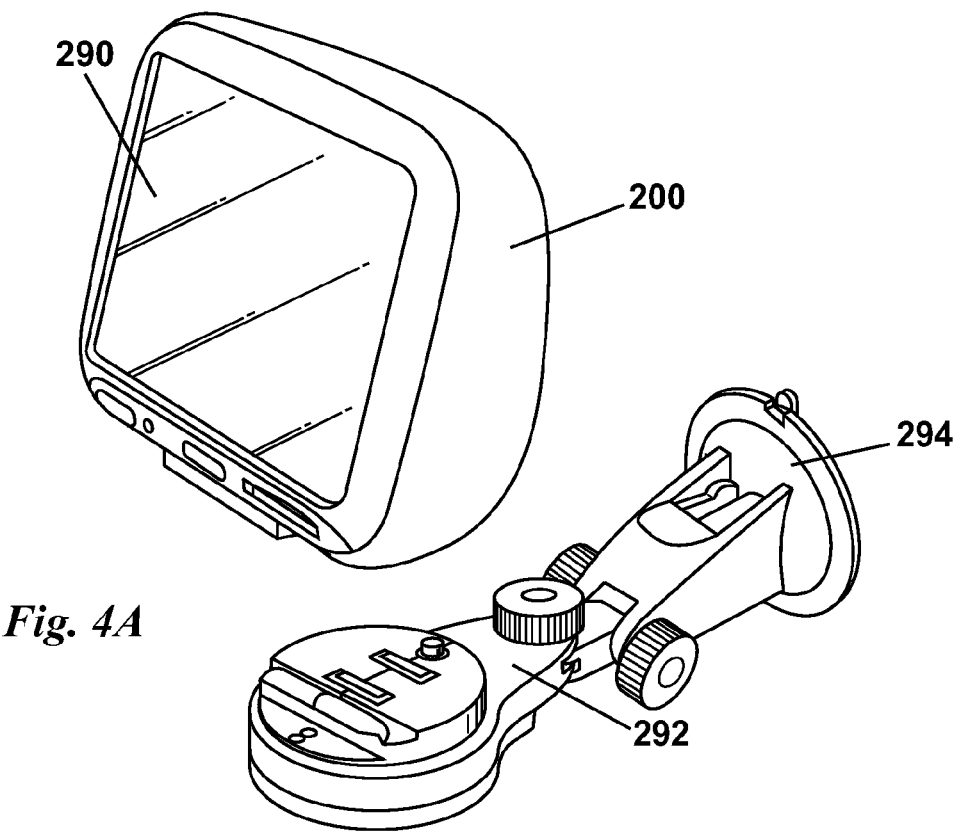
FIGS. 4A and 4B are illustrative perspective views of a navigation device.
Figure 4B:
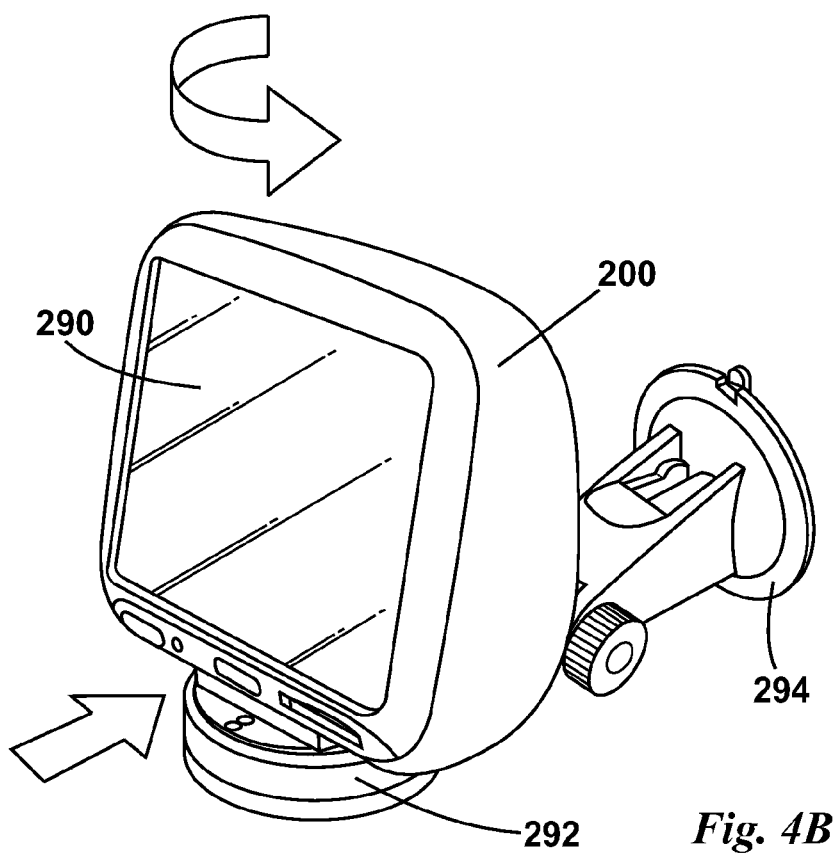

FIGS. 4A and 4B are perspective views of a navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 230, etc.).

The navigation device 200 may sit on an arm 292, which itself may be secured to a vehicle dashboard/window/etc. using a suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example. The navigation device 200 may then be rotatable on the arm 292, as shown by the arrow of FIG. 4B. To release the connection between the navigation device 200 and the docking station, a button on the navigation device 200 may be pressed, for example. Other equally suitable arrangements for coupling and decoupling the navigation device to a docking station are well known to persons of ordinary skill in the art.

As discussed above, an important aspect of the operation of the navigation device 200 of the present embodiment is to display map information to a user on its display screen 240. The map information will be displayed, e.g., in response to a user's inputs, under the control of the processor 210. To facilitate this, the processor 210 includes a graphics processor that renders the desired images for display in response to appropriate graphics commands and data generated by the processor 210.

The map information that is displayed is stored in the memory 230 of the navigation device 200 and then read therefrom and processed appropriately by the processor 210 for display on the display screen 240.

Map information for display may also be stored in the mass data storage 312 of the server 302 and transferred to the memory in the navigation device 200 via the communications channel 318 in use, as required. This will then allow, e.g., the map information stored by the navigation device 200 to be updated in use, and allow the navigation device to have access to and to display more maps than, e.g., could be stored in the memory 230 of the navigation device 200 at any one time.

As discussed above, the present invention relates to methods for preparing and storing the map information to be displayed. A number of preferred embodiments for this will now be described.

The Applicants have recognized that maps of road networks which are typically to be displayed on a navigation device can have a large degree of self-similarity, for example due to re-occurring patterns in, e.g., urban construction and layout. For example, to maximize space and reduce cost, buildings are often arranged in rectangular blocks. The road network surrounding these built-up areas is typically rectangular as well. Even in mountainous or medieval cities, there will often be self-similarity within the road network, although potentially at a lower scale.

Figure 5:
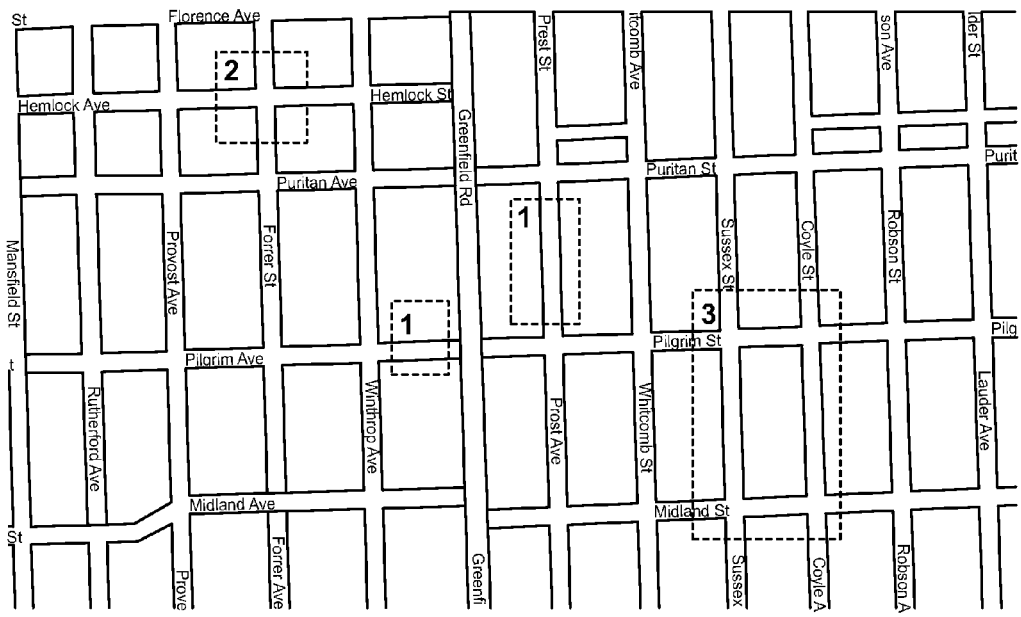

FIG. 5, which shows a map from a suburb of Detroit, Mich., USA, illustrates this. As can be seen in FIG. 5, the map contains a number of similar, horizontally and vertically oriented roads 1, a number of roughly 90° intersections (both 4-way and T-crossings) 2, and combinations 3 of these elements (which may, e.g., be similar under stretching and scaling transformations). A component analysis of this image would show mainly "horizontal" and "vertical" components.

The present embodiment exploits this property of self-repetition within maps to be displayed, to reduce the amount of information necessary to display the maps. In essence, algorithms are applied to reduce the redundancy in the map data, thereby allowing the map display data to be stored in a smaller amount of storage space. This can include exploiting multi-scale self-similarity, and equality under scaling, rotation and translation transformations, or even non-linear transformations.

Figure 6:
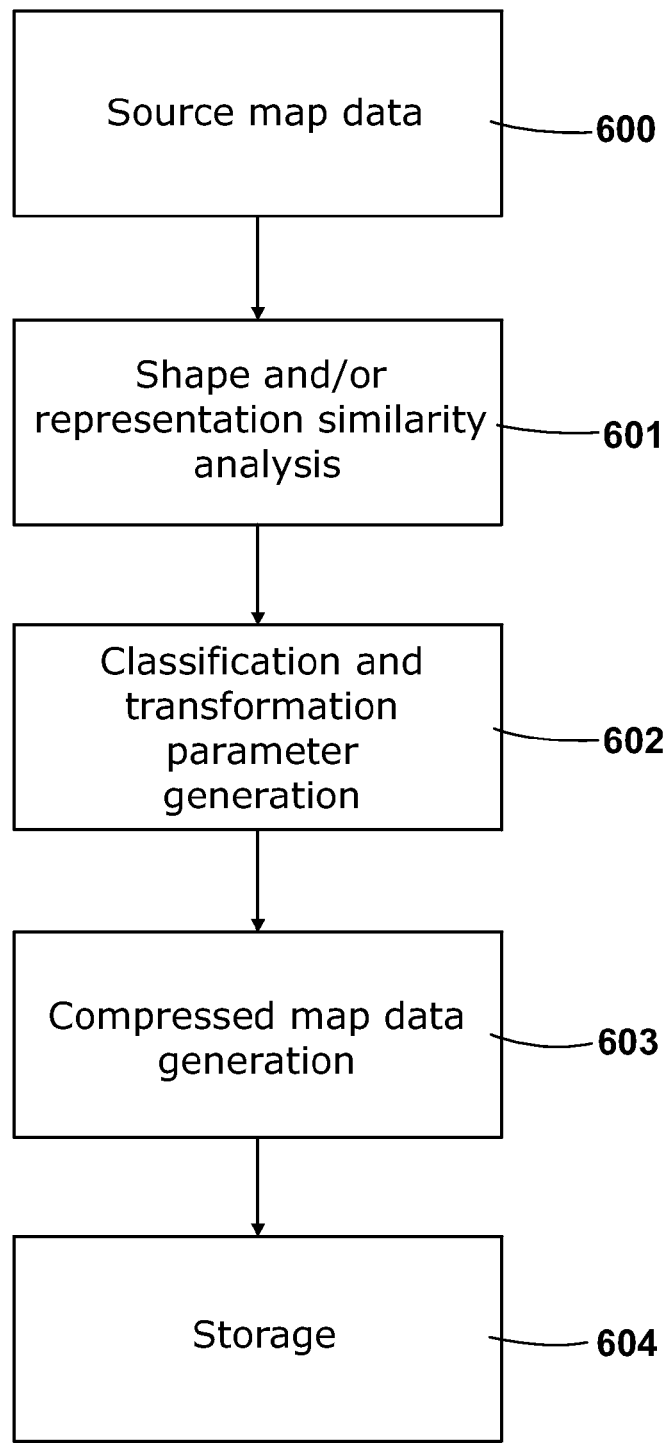
FIG. 6 shows schematically a preferred embodiment for preparing the map representation of the present invention.

FIG. 6 shows schematically an arrangement for preparing a representation of map display information for use by a navigation device in an embodiment of the present invention.

As shown in FIG. 6, a set of source map data 600 is subject to a similarity analysis (step 601) and a classification and transformation parameter generation (step 602), and then a compressed representation of the map data is generated (step 603) and stored in memory (step 604) for use by or provision to the navigation device 200.

The similarity analysis 601 is configured to try to identify shape and/or representation similarity in the source map data. The shape similarity relates to the shape of elements to be displayed in the source map data (e.g. a roundabout is always round-ish) and can be considered to be a property of the source map data. Representation similarity assesses the similarity of elements in the source map that will be similar in the visual domain, i.e. when displayed to a user. For example, roundabouts will tend always to be oval under 3D projection and roads typically will be gray with white lines when displayed (in the visual domain), irrespective of their shape.

The similarity analysis 601 accordingly identifies elements in (represented by) the source map data 600 that are similar in terms of their shape and/or their appearance in the visual domain (when displayed).

The classification and transformation parameter generation process 602 operates to classify elements in the map into "buckets" (i.e. groups) of similar elements (in terms of their shape and/or representation in the visual domain, as determined by the similarity analysis 601). Thus, it, in effect, classifies elements in the map into sets of similar elements which elements can then be used as "reference" elements for the map. Preferably the arrangement is so as to store a full set of data for only a single reference copy of map elements determined to be similar, with the map data then referencing that copy when required and including, e.g., data indicating the place of the element in the map data. The reference map display elements may be stored as bitmaps, or as vector representations, etc.

The classification and transformation parameter generation process 602 also determines the parameters and conditions under which the identified map elements can be considered to be similar. This can include, for example, identifying any necessary rotation, such as scaling or transformation, that is needed to make a given map element similar to another (to the reference element), as determined by the similarity analysis. This process also establishes and stores references between the classified reference map display elements and the original place of the map element in question in the source data. (Alternatively, this could be carried out as a separate step.)

The compressed map generation process 603 operates to apply further compression to the map data. This may use, for example, conventional bitwise compression algorithms. This step is not essential, but applying conventional data compression techniques to the map data further reduces the storage required for the map data.

In this arrangement, the similarity analysis 601 and classification and transformation parameter generation 602 may comprise, e.g., using component analysis techniques such as Fourier analysis or Principal Component Analysis, pattern matching techniques, local search methods, such as simulated annealing, geometric algorithms, etc., to detect the level of self-similarity within the source map information 600 and to extract the basic features of (elements in) the source map information, which features can then be used to reconstruct the original map information data set. The basic features are then stored in the memory 604 as reference map elements together with any further instructions or information (such as transformation parameters) needed to be able to use them to reconstruct the original map for display.

In this embodiment, the similarity analysis 601 and classification and transformation parameter generation 602 operates to derive and generate a map "database" that includes a "library" of predefined (predetermined) map display elements in the form of shape templates having aspects for which desired parameters can be specified, which "base" shape templates can then be used to construct (generate) a desired map for display. The shape templates may be, e.g., in the form of bitmaps, and/or vector representations, etc..

The map database also includes map "construction" information that references into the shape template library and includes parameter information to define how the shape templates should be used and displayed to display the map in question.

The shape templates and map construction information are encoded with less bits than the original map information, so the result is a compressed representation of the original, source map.

For example, a roundabout may, e.g., be stored in the source map information as a set of lines and nodes, often with additional intermediate points to improve the shape. However, the Applicants have recognized that roundabouts in a map database may often be categorized into a limited set of 'similar' roundabouts. A unique roundabout in the source map database can then be described by a reference to a predefined roundabout in a shape library and particular values for additional parameters indicating how the roundabout should be displayed.

The shape template parameters that are set in this regard can be of various types, such as location (longitude, latitude), rotation, etc. Additional lines to describe an entry or exit road could also or instead be a parameter. The parameters could also or instead relate to road-attributes. For instance, turn restrictions of roads that connect to a roundabout will be present in other roundabouts, too.

The parameterization could be done in such a way that a pure lossless compression is achieved. However, in some cases it may be acceptable to have a small error (e.g. a slightly different shape), which is still within an acceptable margin. This can increase the efficiency of the map data compression.

The same principle can be applied to arbitrary other sub-shapes in the map database. For example, a similar thing holds for buildings, and blocks of buildings. Buildings can be categorized into a library of predefined buildings too, and by adding parameters this can be exploited for size. For example, location, scale, rotation, and texture, or even sub-shape, can be parameters of the predefined shape templates.

The set of shape-templates to be used for the map database and how to parameterize them is determined by applying an appropriate algorithm to the initial, source map information. Suitable algorithms for this could use, e.g., simple heuristics, genetic algorithms, simulated annealing, etc.

In the present embodiment, the shape-templates (for roads, buildings and terrain) are constructed hierarchically, so as to be able to apply them appropriately for different levels of detail. For example, a residential block may be a single cube in the database, with additional refinements. The single cube with coarse texture is shown on high zoom levels. Additional shapes (e.g. higher boxes on top of the coarse block) are then used for finer zoom levels, accompanied by a refinement of the texture.

The shape templates also have associated with them a number of attributes, e.g., indicating an appropriate texture or textures to be applied or that could be applied to the template to provide details such as road markings, one-way markers, etc.. This then allows the same base shape template to be used, even though different parts of the road network can differ by details such as road markings, one-way markers, etc.. Such attributes can also be employed to augment the displayed road network with, e.g., "face" data showing land use in a geographical area. Multiple textures may be used on a given display element (shape template) if desired.

It would also be possible to use different template sets for certain areas, e.g. for left- and right-driving countries, or countries with special traffic rules.

The shape-definition of an entry in the shape-template library could refer to other entries in the library as well. This can in some be cases be useful to decrease the size of the shape-definitions in the library.

In these arrangements where base map display elements are stored and then referenced when the map is to be displayed, the system can advantageously be used for remote applications such as, e.g., a web-based map or over-the-air updates of base map data or map patch distribution. For example, a map patch showing a roundabout would only need to transfer the reference to the already stored shaped template or map display element representing a roundabout in the library of map display elements that is already stored by the navigation device. A whole, new map could be distributed by sending new map construction information referencing the predefined map display elements (shape templates) in the library of map display elements.

Figure 7:
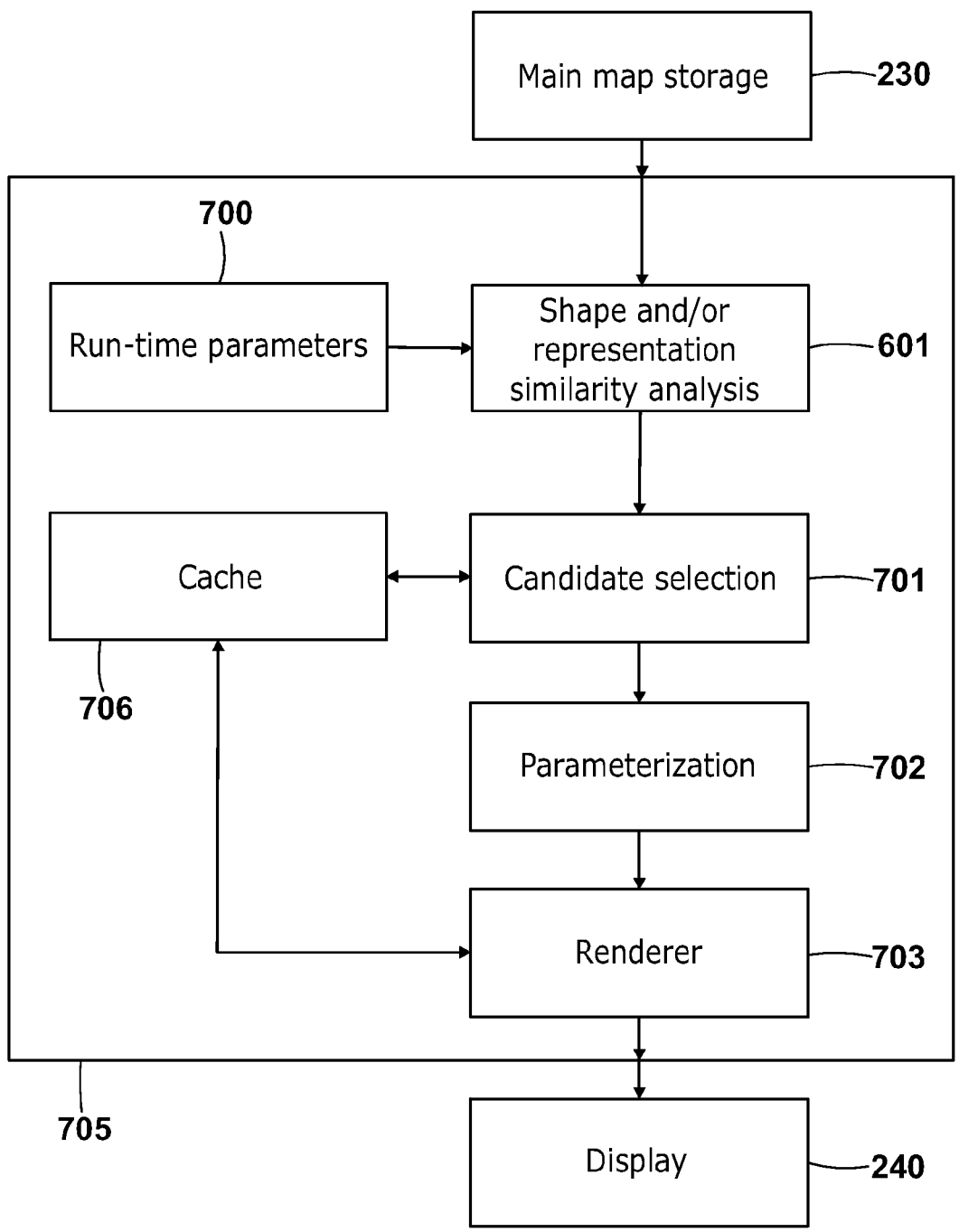
FIG. 7 shows schematically a preferred embodiment for rendering a map for display in the present invention.

FIG. 7 shows a preferred embodiment for using the map information that has been prepared in accordance with the above techniques to display a map on the display device 200.

The Applicants have further recognized that similarity between map elements to be displayed can be exploited to reuse already cached map elements when displaying a map, thereby reducing computational load on the rendering processor as well as reducing the amount of memory access by reducing the need to retrieve data and transfer information to the rendering processor.

FIG. 7 shows a preferred embodiment of this process.

As shown in FIG. 7, when the application processor 705 is due to process new data (representing, e.g. a new map element or elements) from the main map storage 230 for display, it checks to see whether any existing data in its cache 706 represents a similar element to the new data that should be processed. This is done by performing a shape and/or representation similarity analysis 601 between the new map elements to be processed and any already processed map elements that are stored in the cache 706.

The similarity analysis 601 is configured and operates in the same manner as the similarity analysis 601 shown in FIG. 6. Thus the similarity analysis 601 in FIG. 7 operates to consider and identify map elements that can be considered to be similar in shape and/or representation in the visual domain (i.e. when displayed). The similarity analysis 601 is also configured to take account of run-time parameters 700, such as the position of the map element (e.g. geometry) in the world, the camera angle, projection settings, whether fogging is used, display resolution, color depth, etc.. These run-time parameters are used to tune the similarity analysis and error margin allowed for the similarity analysis. The Applicants have recognized that an assessment of whether given map elements for display can be considered to be sufficiently similar or not can depend on such run-time parameters, and therefore the present embodiment takes them into account in the similarity analysis.

The similarity analysis 601 considers, in the light of the run-time parameters 700, whether a map element already stored in the cache 706 can be considered to be sufficiently similar to a new map element to be processed and loaded from the main map storage 230. The map element to use for display is then selected in a candidate selection stage 701 based on the similarity analysis. The chosen candidate may be a processed map element that is already in the cache 706, or it may be new map data to be processed from the main map storage 230, based on the results of the similarity analysis.

The similarity analysis 601 uses a function that calculates the relative error between the candidate map elements being compared (i.e. in the cache and in the main map store) and determines whether the error is below a selected threshold value or not. If the error is above the threshold value, new data will be generated. The relative error calculation function could use image analysis techniques, for example, and/or store this data in some form when the map elements (data) are generated.

In a preferred embodiment, the similarity assessment 601 uses Primary Component Analysis (PCA) techniques (or similar) to determine the major axes of contribution of a given map display element, etc.. (For the road junction map display element shown in FIG. 9, this would be a mainly vertical component (the road with the dashes) as most contributing component, directly followed by a mainly horizontal component (the road to the right) as well as probably some minor components.)

This 'contributing component' data is then stored alongside the data for the map display element, e.g. bitmap (or other representation), in the cache 706. The root mean squared error (RMSE) between the contributing components of the already stored map display element, and the contributing components of the desired map display element is then determined and used as the relative "error" measurement. The "desired components" (i.e. those that need to be rendered) can be stored alongside vector data in the map database (main map storage 230).

Depending on the type of rendering technique (tile/bitmap or vector), image analysis techniques such as the Hough transform to detect lines/circles or skeletization techniques may be used to derive the necessary error comparison information (e.g. if the bitmaps were not generated on the fly and thus this information is not available).

Other similarity assessment arrangements and processes would, of course, be possible. For example, in the present embodiment, it is the "host", application processor of the navigation apparatus that performs the similarity assessment, but other arrangements such as having a separate processor (e.g. a DSP) or the rendering processor (e.g. GPU) itself, doing this, would be possible if desired.

The selected map element candidate for display is then subject to appropriate parameterisation for display in a parameterisation step 702. Such parameterisation is based on the run-time parameters (e.g. rotation, skew, scaling factors, transparency, color re-mapping parameters, etc.), and may be used to modify and control the way the element is displayed in view of the current (run-time) display conditions for the element.

The selected candidate map display element is then rendered appropriately in a rendering step 703 for display on the display 240. The rendering step may be carried out, as is known in the art, either in software or using a graphics processor, for example. The renderer 703 may also generate a version of the rendered map element for storage in the cache 706 for future use.

Thus, in this arrangement, when map data is to be processed for display, it is determined whether to use already cached map data to display the map data in question, or whether new map data needs to be loaded and processed from the main map storage 230. This is done by means of a similarity analysis 601. If the map data already in the cache 706 is determined to be sufficiently similar to the map data that is to be displayed, the new data from the memory 230 is not loaded, but instead the existing data in the cache is processed for display of the map element in question. This has the benefit of a reduced system load, since already processed data does not need to be reloaded and reprocessed.

In a preferred embodiment, the caching process is scaleable, depending upon the memory available to the rendering process. For example, if less memory is available, cached data can be evicted and regenerated more often. Normal cache eviction mechanisms can also be used (LRU, FIFO etc.), if desired.

In the present embodiment, the similarity analysis 601 for deciding whether new data needs to be processed for display is modified depending upon the distance from the viewer of the map element that is being displayed. The Applicants have recognised that as the amount of visible detail decreases with distance from the viewer, the similarity analysis can employ a larger error margin, the greater the distance from the viewer of the map element in question. Employing a larger error margin for the similarity analysis increases the chance of a match from the cache and thus the efficiency of the process.

Figure 8:
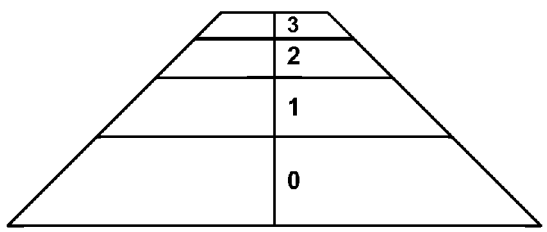
FIGS. 8 and 9 illustrate further preferred techniques for use in a preferred embodiment of the present invention.

FIG. 8 illustrates this. Map display elements, such as tiles and textures at level zero (nearest to the viewer) shown in FIG. 8 will have and require the highest accuracy, but the accuracy requirement decreases with distance from the viewer (indicated by a higher number in FIG. 8). Thus the similarity analysis 601 takes account of the level of detail required. To do this, multiple levels of detail (accompanied by error figures as described above) are stored simultaneously in the cache (like for mip-mapping techniques).

The embodiment also applies transformations, such as scaling, rotation and/or translation, to map display elements that are to be displayed. This is to compensate for slight variations in the road network, such as map display elements not being perfectly aligned in their "base", defined form. This may in particular be used for map display elements that are further from the viewer (nearer map display elements may need to be loaded and processed in full, as simply applying a transformation may lead to unacceptable visual quality).

Figure 9:
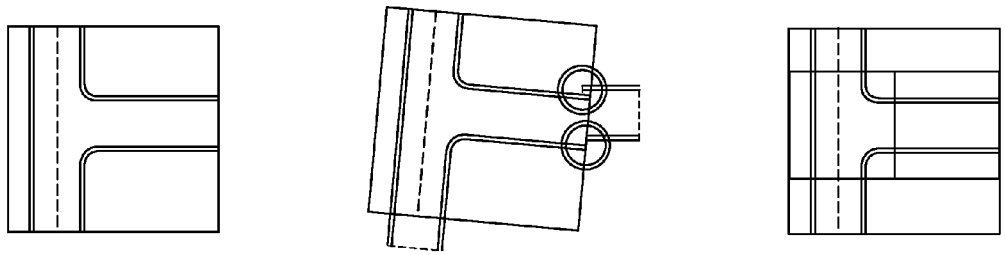

FIG. 9 illustrates this, and shows in the first two figures the need to apply a rotational transformation to a base map display element to improve the accuracy of the reused map display element. Any misalignment, and the form of translation to apply to compensate for it, is determined by comparing the contributing components of a map display element (e.g. shape template) in the cache to the corresponding components of the element actually to be displayed. Simple affine rotations are employed. For scaling, a comparison of desired and available scale is done.

FIG. 9 also illustrates in the right-hand image a further feature of this embodiment, namely splitting a larger map display element into smaller components and storing those components individually. This may reduce the effects of any non-alignment, and help to prevent too much distortion of bitmaps under scaling, for example. Also, since the individual, smaller features may be expected to occur more frequently, they may be reused more frequently as well.

The present invention may be used for any form or representation of the map display information. For example, the self-similarity holds both for bitmap data (e.g. when rendering tiles) and for vector (2D/3D) data.

Furthermore, the present invention is applicable for digital terrain models as well. For example, self-similarity is to be expected in mountains as well, and a level-of-detail refinement as described above would suit terrain models (the acceptable error margin for terrain models may be higher).

As will be appreciated from the above, the present invention facilitates the storage of map information, for use, e.g., with PNDs, in a more compact form. This then leads to smaller storage requirements for the map information, thereby facilitating, e.g., cost reduction in terms of storage (e.g. a lower bill of materials), and potentially speed increases due to caching effects and a reduction in the load/read requirements on the storage medium.

This is achieved, in the preferred embodiments of the present invention at least, by identifying and exploiting redundancy in the "raw" map information, so as to prepare a revised version of the "raw" map information for use.

In a preferred embodiment, the map information can be updated remotely, for example via over-the-air updates of base map features, such as tiles, and/or other geometry features. In extreme cases, an entire map can be distributed in this way. Thus the present invention, in its preferred embodiments at least, is well-suited for use with remote applications, such as a web-based map viewer, over-the-air map distribution and/or updating, etc..

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment may implement certain functionality by means of software, that functionality could equally be implemented solely in hardware (for example by means of one or more ASICs (application specific integrated circuit)) or indeed by a mix of hardware and software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A method of preparing map information for use for displaying maps on a mapping or navigation apparatus, the method comprising:
    receiving initial map information representing a map or maps to be displayed;
    performing, by a processor, a similarity analysis, the similarity analysis comprising analyzing map features within the initial map information to determine whether similarities exist between the map features based on shape and appearance when displaying the initial map information to identify one or more similarities within the initial map information;
    reducing, by the processor, the initial map information to generate reduced initial map information, the reducing comprising:
        selecting, based on the similarity analysis, one or more predefined map display elements, each predefined map display element being a shape template representing a corresponding shape to be displayed on a map constructed using the predefined map display element; and
        replacing, based on the similarity analysis, at least one selected map feature from the initial map information with a reference to the corresponding predefined map display element and one or more parameters, wherein the one or more parameters comprise an indication of a transformation to be applied to the corresponding predefined map display element when the corresponding predefined map display element is displayed;
    the reduced initial map information being a further representation of the map or maps to be displayed.

2. The method of claim 1, wherein the similarity analysis identifies two dimensional map elements represented by the initial map information that are similar to each other when displayed.

3. The method of claim 1 wherein the similarity analysis identifies and extracts base features from the initial map information, wherein one or more of the base features are configured to be used to re construct the map that the initial map information represents.

4. The method of claim 1, wherein the further representation of the map or maps comprises:
    a map database comprising a library of predefined map display elements, the library of predefined map display elements comprising the one or more predefined map display elements; and
    map construction information that references the library of predefined map display elements and indicates how to reproduce the map or maps that the initial map information represents using predefined map display elements from the library of predefined map display elements.

5. The method of claim 1, wherein replacing the at least one selected map feature from the initial map information with the reference to the corresponding predefined map display element comprises:
    associating, with the reference, one or more attributes that are to be applied or used when the corresponding predefined map display element is displayed.

6. The method of claim 1 further comprising displaying the further representation of the map or maps on the mapping or navigation apparatus.

7. A system for preparing map information for use for displaying maps on a mapping or navigation apparatus, the system comprising:
    a processor;
    a memory coupled to the processor, wherein the processor is operable to:
    perform a similarity analysis, the similarity analysis comprising analyzing map features within the initial map information to determine whether similarities exist between the map features based on shape and appearance when displaying initial map information representing a map or maps to be displayed to identify one or more similarities within the initial map information;
    reduce the initial map information to generate reduced initial map information, the reducing comprising:
        selecting, based on the similarity analysis, one or more predefined map display elements, each predefined map display element being a shape template representing a corresponding shape to be displayed on a map constructed using the predefined map display element; and
        replacing, based on the similarity analysis, at least one selected map feature from the initial map information with a reference to the corresponding predefined map display element and one or more parameters, wherein the one or more parameters comprise an indication of a transformation to be applied to the corresponding predefined map display element when the corresponding predefined map display element is displayed;
    the reduced initial map information being a further representation of the map or maps to be displayed.

8. The system of claim 7, wherein the processor is further operable to identify, during the similarity analysis, two dimensional map elements represented by the initial map information that are similar to each other when displayed.

9. The system of claim 7, wherein the processor is further operable to identify and extract, during the similarity analysis, base features from the initial map information, wherein the at least one of the base features is configured to be used to re construct the map that the initial map information represents.

10. The system of claim 7, wherein the further representation of the map or maps to be displayed comprises:
   a map database comprising a library of predefined map display elements, the library of predefined map display elements comprising the one or more predefined map display elements; and
   map construction information that references the library of predefined map display elements and indicates how to reproduce the map or maps that the initial map information represents using predefined map display elements from the library of predefined map display elements.

11. The system of claim 7, wherein the mapping or navigation apparatus comprises a display, wherein the display displays the further representation of the map or maps.

12. A non-transitory computer readable medium program comprising computer readable instructions executable to perform a method comprising:
   receiving initial map information representing a map or maps to be displayed;
   performing a similarity analysis, the similarity analysis comprising analyzing map features within the initial map information to determine whether similarities exist between the map features based on shape and appearance when displaying the initial map information to identify one or more similarities within the initial map information;
   reducing the initial map information to generate reduced initial map information, the reducing comprising:
      selecting, based on the similarity analysis, one or more predefined map display elements, each predefined map display element being a shape template representing a corresponding shape to be displayed on a map constructed using the predefined map display element; and
      replacing, based on the similarity analysis, at least one selected map feature from the initial map information with a reference to corresponding predefined map display element and one or more parameters, wherein the one or more parameters comprise an indication of a transformation to be applied to the corresponding predefined map display element when the corresponding predefined map display element is displayed;
   the reduced initial map information being a further representation of the map or maps to be displayed.

13. The computer-readable medium of claim 12 further comprising displaying the further representation of the map or maps on the mapping or navigation apparatus.

* * * * *